Fig. 1.

United States Patent Office 3,265,234
Patented August 9, 1966

3,265,234
LAMINATING RESINS FOR CATHODE
RAY TUBES
Charles W. McGary, Jr., and Charles T. Patrick, Jr., South
Charleston, W. Va., assignors to Union Carbide Corporation, a corporation of New York
Filed Feb. 6, 1963, Ser. No. 256,628
8 Claims. (Cl. 220—2.1)

This invention relates to laminating resins useful in the manufacture of cathode ray tubes. In one aspect, this invention relates to resins having outstanding physical properties not heretofore found in laminating compositions. In a further aspect, this invention relates to laminating resins comprised of certain polyepoxides which are ideally suited for laminating safety implosion plates or caps to the viewing surface of television picture tubes.

Laminating resins have been employed in many fields, such as, for example, in the manufacture of automotive safety glass, reinforced electrical insulating panels, and the like. In order to qualify as acceptable laminates for application in these and other fields, the resins must possess certain physical characteristics, such, as for example, good adhesion, adequate hardness, good heat stability, toughness and flexibility, good light resistance, high softening points, and the like. It is recognized, however, that the physical characteristics required in a laminating resin may vary widely, depending upon the use for which it is intended and hence, some of the aforesaid physical characteristics may be deficient or entirely absent without adversely affecting the properties of the laminated article.

One of the more recent applications of laminating resins is in the manufacture of cathode ray tubes, particularly television picture tubes. A new technique developed in the past few years for protection from television picture tube implosion, consists of attaching a glass implosion plate or cap over the entire viewing surface of the tube. Attachment of the plate or cap to the tube is achieved by the use of a laminating resin, i.e., a hardenable transparent liquid which upon curing secures the plate or cap to the viewing surface. The problem of finding economically attractive laminating resins for use in attaching implosion plates to cathode ray tubes has been the source of continued research. Perhaps the greatest problem in finding suitable resins has been the absence of a composition which has the required optical properties, glass adhesion, low temperature flexibility and toughness, little shrinkage, and which is economical both in cost and application. Numerous resins have been investigated and evaluated for laminating use, such as the polyesters, the polyepoxides, and other resin systems. It has been found, however, that in certain applications the polyester resins were largely unsatisfactory due to excessive shrinkage and poor low temperature flexibility. When the implosion plate consists of sagged polished plate glass and merely covers the face of the picture tube, a certain amount of resin shrinkage and stiffness can be tolerated. However, when the implosion plate consists of a cap, the edges of which wrap around the periphery of the viewing area of the tube, low temperature stiffness and shrinkage of the laminating resin create high stresses generally in the corner areas where the cap overlaps the tube. This results in numerous instances of glass and/or resin failure particularly if any minor scratches or defects are present in the glass. Hence, a laminating resin which has low temperature flexibility and which exhibits little or no shrinkage, in addition to the other necessary physical properties, would find application in the manufacture of cathode ray tubes containing implosion plates or caps. The economic advantages inherent in the use of but a single resin system for both types of implosion protection, i.e., plates or caps, are readily evident.

The polyeproxide resins have also been investigated for use in laminating applications and, for the most part, have proven successful. Polyepoxides are known to possess excellent glass adhesion as well as other desirable chemical and physical properties. For example, epoxy resins derived from polyhydroxyaromatic compounds of the benzenoid series have been utilized with a diepoxide of a polyalkylene glycol as a flexibilizer to prepare transparent laminates of glass to glass, glass to organic polymeric material, and in the bonding of other materials. Although such resin systems have found application in laminating safety implosion plates or caps to cathode ray tubes, they have not been without their disadvantages. For example, it has been observed that resin systems containing the Bisphenol A type structure discolor on prolonged exposure to radiation. While, for the most part, epoxy resin laminates do not exhibit the same degree of shrinkage as the polyester laminates, resin shrinkage occurring during cure and cooling together with poor low temperature flexibility likewise result in cap failure, particularly at low temperatures. This problem is further enhanced when minor glass flaws, such as scratches, are present, particularly in the corner areas.

It is, therefore, an object of this invention to provide laminating resins having outstanding physical characteristics which render them useful in the manufacture of cathode ray tubes. A further object is to provide epoxy resin compositions suitable for laminating safety implosion plates to cathode ray tubes. Another object of this invention is to provide epoxy resin compositions suitable for laminating safety implosion plates to television picture tubes. An object of this invention is to provide a resin composition which is cured at relatively low temperatures to provide a laminate having low temperature flexibility and toughness. A further object is to provide cathode ray tubes having implosion plates laminated thereto by the aforesaid resin compositions. Another object of this invention is to provide epoxy resin compositions comprising a cycloaliphatic polyepoxide, e.g., 3,4-epoxy-6-methylcyclohexylmethyl 3,4-epoxy-6-methylcyclohexane-carboxylate. An object of this invention is to provide a process for the preparation of the laminating resins. A further object is to provide a process for laminating safety implosion plates to cathode ray tubes. These and other objects will readily become apparent to those skilled in the art in the light of the teachings herein set forth.

This invention is based on the discovery that a laminating composition comprising in critical amounts, (1) certain cycloaliphatic polyepoxides, e.g., 3,4-epoxy-6-methylcyclohexylmethyl 3,4 - epoxy-6-methlcyclohexane-carboxylate, (2) certain relatively high molecular weight aliphatic polyols, (3) a low molecular weight aliphatic polyol, (4) an anhydride, and (5) an organic tin catalyst, upon curing possesses outstanding and unexpected physical properties which render it especially suitable for use in laminating implosion plates or caps to the viewing surface of television tubes. Moreover, it has been found that when the aforementioned components are employed in a resin composition, in the proportions hereinafter indicated, there is obtained a product having excellent optical properties, little or no shrinkage, good flexibility and low temperature strength, as well as other highly desirable features.

It has also been discovered that when the resin compositions are prepared with the omission of one or more of the aforesaid ingredients, or with the concentration of one or more ingredients outside the critical ranges hereinafter indicated, the products obtained are unsuitable for use as laminates in the manufacture of television tubes. Such products have lower softening points, higher viscosities, poor flexibility and low temperature strength, and other undersirable properties which render them unsuitable for the intended use. This phenomenon of physical property differences is unusual in itself since resins prepared from 3,4-epoxy-6-methylcyclohexymethyl 3,4-epoxy - 6 - methylcyclohexanecarboxylate have been known heretofore in other applications, and it would be expected that the use of the aforementioned ingredients would yield a product which would possess similar physical characteristics. However, such is not the case. In most instances, resin systems while containing cycloaliphatic polyepoxides, are deficient in one or more of the physical properties necessary for satisfactorily laminating implosion plates or caps to cathode ray tubes. It has been further discovered that only selected anhydrides, polyols and curing catalyst yield resins which have the optimum combination of properties suitable for use as laminates in cathode ray tube applications.

As hereinbefore indicated, the laminating resins of this invention are composed of a cycloaliphatic polyepoxide, a high molecular weight aliphatic polyol, a low molecular weight aliphatic polyol, an anhydride, and an organic tin catalyst. The cycloaliphatic polyepoxides which can be employed in the laminating compositions of this invention can be represented by the following formula:

wherein X represents divalent radicals selected from the group consisting of and in which R represents members selected from the group consisting of lower aliphatic hydrocarbon groups and lower oxyalkylene groups and $R_1$ through $R_6$ represent members selected from the group consisting of hydrogen and lower alkyl groups. Preferred compounds are those represented by the aforesaid formula wherein R contains from 2 to 6 carbon atoms and $R_1$ through $R_6$ represent hydrogen and lower alkyl of from 1 to 4 carbon atoms. Illustrative cycloaliphatic polyepoxide compounds include: 3,4-epoxy - 6 - methylcyclohexylmethyl 3,4-epoxy-6-methylcyclohexanecarboxylate, diethylene glycol bis-(3,4-epoxycyclohexanecarboxylate), bis(3,4 - epoxycyclohexylmethyl) maleate, bis(3,4 - epoxycyclohexymethyl) pimelate, bis(3,4 - epoxy-6-methylcyclohexylmethyl) maleate, bis(3,4 - epoxy - 6 - methylcyclohexylmethyl) succinate, diethylene glycol bis(3,4-epoxy-6-methylcyclohexanecarboxylate), 3 - methyl - 1,5 - pentanediol bis-(3,4-epoxycyclohexanecarboxylate), triethylene glycol bis-(3,4-epoxycyclohexanecarboxylate), 1,5 - pentanediol bis-(3,4-epoxycyclohexanecarboxylate), 2 - methoxymethyl - 2,4-dimethyl - 1,5 - pentanediol bis - (3,4 - epoxycyclohexanecarboxylate), ethylene glycol bis - (3,4 - epoxycyclohexanecarboxylate), ethylene glycol bis - (3,4-epoxy-6-methylcyclohexanecarboxylate), 2,3 - diethyl - 1,3 - propanediol bis - (3,4-epoxycyclohexanecarboxylate), 1,6-hexanediol bis - (3,4-epoxycyclohexanecarboxylate), 3 - methyl-1,5-pentanediol bis - (3,4 - epoxy-6-methylcyclohexanecarboxylate), and the like.

The high molecular weight aliphatic polyols which are utilized in the preparation of the novel laminating resins of this invention are linear polyhydric compounds composed of carbon, hydrogen, and oxygen, the oxygen being present only as etheric oxygen or oxygen of the hydroxyl groups. Moreover, it is imperative that the polyols be characterized by a molecular weight within the range of 750 to 2500 and a hydroxyl equivalent weight of from 275 to 1250 in order to impart the desired toughness and flexibility. Suitable high molecular weight polyols characterized by the aforementioned properties include the polyalkylene glycols, e.g., the polyoxyethylene glycols, the polyoxypropylene glycols, the mixed polyoxyethylene-polyoxypropylene glycols, the reaction products of (1) alkylene oxides, for example, ethylene oxide, propylene oxide, butylene oxide, or mixtures thereof, and (2) an alkylene glycol, the reaction product of alkylene oxides and diols, the reaction product of alkylene oxides and triols, and the like. Polypropylene glycols having molecular weights of about 2000 are particularly preferred for use in the laminating resin compositions.

As indicated above, the molecular weight of the high molecular weight polyol must be within the range of from 750 to 2500 to impart the desired low temperature flexibility to the resulting laminate. It was discovered that the molecular weight of the polyol had a dramatic effect on resin properties, and while the use of polyols having molecular weights below 750 gave resins which were softer and stronger at 25° C., they became weak and quite rigid at —20° C. In contrast, resins which contained polyols of molecular weights over 750, for example, 1000 or 2000, while more rigid at 25° C., were tough and flexible at —20° C.

It has been further discovered that the use of the aforementioned high molecular weight polyols alone will not impart the desired low temperature flexibility and toughness to the cured laminate. Flexibility at low temperatures was found to be partly a function of the high molecular weight polyol content, an increased polyol content providing a more flexible laminate. However, as the polyol content of the curable laminating resin is increased, the rate of cure is decreased. Inasmuch as the rate of cure greatly influences the physical properties, the resulting laminate was found to be deficient in one or more physical properties, which rendered it unsuitable for laminating implosion plates or caps to cathode ray tubes. It was unexpectedly and surprisingly found that the successful use of an increased content of the high molecular weight polyol was contingent upon increasing the overall hydroxyl content of the system. This was achieved by supplementing the high molecular weight polyols with certain low molecular weight polyols. This served to maintain the low temperature flexibility characteristics imparted by the high molecular weight polyols, and simultaneously maintain the rate of cure necessary to achieve other desired physical properties.

The low molecular weight polyols which can be employed in this invention are those composed of carbon, hydrogen and oxygen, and which have an hydroxyl equivalent weight of less than 114. Suitable low molecular weight polyols which can be employed include diols and triols such as, for example, ethylene glycol, diethylene glycol, triethylene glycol, tetraethylene glycol, propylene glycol, dipropylene glycol, tripropylene glyco, hexylene glycol, 1,2,6-hexanetriol, 1,5-pentanediol, 2-ethyl-1,3-hexanediol, 2-methyl, 2-ethyl, 1,3-propanediol, and butanediol.

The anhydrides employed in the laminating resins of this invention are certain anhydrides of aliphatic dicarboxylic acids having melting points of 65° C., or lower. It is imperative that the anhydride be derived from an aliphatic dicarboxylic acid otherwise the low temperature flexibility and toughness required in the laminating resin will not be achieved. Moreover, only those anhydrides derived from acids which have an ionization constant ($K_A$) of at least $2 \times 10^{-5}$ are suitable for use in the present laminates. Thus, the anhydrides which have been found suitable for use are maleic anhydride, glutaric anhydride and the halogenated derivatives thereof, e.g., chloromaleic anhydride, dichloromaleic anhydride and the like.

Although a variety of catalysts will promote the cure on polymerization of epoxide compositions into infusible and insoluble products of relatively high molecular weight, many catalysts suffer the disadvantages of effecting rapid and uncontrolled exotherms during the curing stage. For example, the use of Lewis acid catalysts such as boron trifluoride frequently causes thermal decomposition in the admixture as evidenced by charring, or expulsion of the components in bubble formation and foaming. Of greater concern, is the undesirable color properties which many catalysts impart to epoxy resin systems. In the application of epoxide compositions as laminates for television tube implosion plates, it is imperative that the optical properties of the laminating resin be at least equal to the properties of the glass tube and implosion plate. Hence the catalyst employed in the instant invention must effectively promote the cure of the epoxide compositions without imparting any undesirable color to the laminate.

Of paramount importance in the choice of curing catalyst are the rate of cure and temperature at which curing is effected. It has been found that certain organic tin catalysts, when employed in specific and controlled amounts, are particularly effective in providing curable compositions which have good working life, low gel temperature, and which can be conveniently cured within the temperature range of from about 30° to about 80° C.

The organic tin catalyst which can be employed in the preparation of the laminating compositions of this invention include the stannous and stannic acylates, the stannous and stannic alkoxides, the oxidized stannous acylates, the stannic mercaptides and the stannic organophosphates.

Of the aforementioned catalysts, the stannous acylates are preferred. These compositions are the divalent salts of aliphatic mono- and dicarboxylic acids which contain from 1 to 20 carbon atoms. The acids can be saturated such as acetic acid, 2-ethylhexanoic, etc., or they may be unsaturated acids such as oleic, linoleic, ricinoleic, and the like. Examples of specific stannous acylates which can be used include: stannous propionate, stannous oxalate, stannous tartrate, stannous butyrate, stannous valerate, stannous caproate, stannous octoate, stannous laurate, stannous palmitate, stannous stearate, and stannous oleate. Of these materials the particularly preferred catalysts are stannous acetate, stannous octoate and stannous oleate.

Other suitable tin catalysts which can be employed are the stannic acylates. These compositions are the tetravalent tin salts of aliphatic mono- and dicarboxylic acids which contain from 1 to 54 carbon atoms. The acids can be saturated such as acetic acid, 2-ethylhexanoic, etc., or they may be unsaturated acids such as oleic, lineolic, ricinoleic, and the like. Examples of specific acylates which can be used include: stannic acetate, stannic propionate, stannic oxalate, stannic tartrate, stannic butyrate, stannic valerate, stannic caproate, stannic caprylate, stannic octoate, stannic 2-ethylhexoate, stannic laurate, stannic palmitate, stannic stearate, and stannic oleate. Of these materials, the preferred catalysts are stannic 2-ethylhexoate and stannic oleate. The stannic acylates may be made by known methods (H. Schmidt, C. Blohm and G. Jander, Angew, Chem., A59, 233 (1947)).

The stannous alkoxides which are used may be represented by the formula:

$$Sn(OR)_2$$

in which R is a monovalent hydrocarbon radical, saturated or unsaturated, branched chain or straight chain, containing 1 to 18 carbon atoms, preferably 3 to 12. Representative examples of stannous alkoxides include stannous methoxide, stannous isopropoxide, stannous butoxide, stannous t-butoxide, stannous 2-ethylhexoxide, stannous tridecanoxide, stannous heptadecanoxide, stannous phenoxide, and o, m and p-stannous cresoxides, and the like.

The stannic alkoxides which are used may be represented by the formula:

$$Sn(OR)_4$$

in which R is a monovalent hydrocarbon radical, saturated or unsaturated, branched chain or straight chain, containing 1 to 18 carbon atoms, preferably 3 to 12. Representative examples of stannic alkoxides include stannic methoxide, stannic isopropoxide, stannic butoxide, stannic t-butoxide, stannic t-amyloxide, stannic 2-ethylhexoxide, stannic tridecanoxide, stannic heptadecanoxide, stannic phenoxide, and o, m and p-stannic cresoxides, and the like.

The oxidized stannous acylates can be represented by the formula:

$$Sn(O\overset{\overset{\displaystyle O}{\|}}{C}R)_2$$

wherein R is a monovalent hydrocarbon radical, branched chain or straight chain, and containing from 1 to 54 carbon atoms and more preferably from 1 to 24. In general, the oxidation is conveniently carried out by the addition of anhydrous oxygen to the liquid stannous acylate at a temperature of from about 25° C. to about 125° C. It is necessary that dry oxygen be employed to react with the stannous acylate, inasmuch as hydrolysis of the stannous acylate will occur in the presence of moisture. If desired, air may be used to perform the oxidation step, however, as indicated above, it should be dried before reaction with the stannous acylate. Other organic and inorganic oxidizing agents may also be used such as benzoyl peroxide, diacetyl peroxide, potassium permanganate, and the like.

The stannous acylates which are used in the preparation of the catalysts of the invention are the divalent tin salts of aliphatic mono- and dicarboxylic acids which contain from 1 to 54 carbon atoms. The acids can be saturated such as acetic acid, 2-ethylhexanoic, etc., or they may be unsaturated acids such as oleic, linoleic, ricinoleic, and the like. Examples of specific stannous acylates which can be oxidized to the catalysts of this invention include: stannous acetate, stannous propionate, stannous oxalate, stannous tartrate, stannous butyrate, stannous valerate, stannous caproate, stannous caprylate, stannous octoate, stannous laurate, stannous palmitate, stannous stearate, and stannous oleate. Of these materials the preferred compounds are stannous acetate, stannous octoate and stannous oleate.

The stannic mercaptides which are used may be represented by the formula:

$$Sn(SR)_4$$

wherein R is a monovalent hydrocarbon radical, saturated or unsaturated, branched chain or straight chain, containing 1 to 18 carbon atoms, preferably 1 to 12. Representative examples of stannic mercaptides include stannic methyl mercaptide, stannic propyl mercaptide, stannic isopropyl mercaptide, stannic butyl mercaptide, stannic t-butyl mercaptide, stannic amyl mercaptide, stannic t-amyl mercaptide, stannic 2-ethylhexyl mercaptide, stannic t-heptyl mercaptide, stannic n-octyl mercaptide, stannic tridecyl mercaptide, stannic heptadecyl mercaptide, stannic phenyl mercaptide, and the like.

The stannic mercaptides may be made by an exchange reaction of a stannic alkoxide, such as stannic t-amyloxide, with a thiol to form the mercaptide and the corresponding alcohol of the stannic alkoxide. The stannic alkoxides may be made by the method of D. C. Bradley, E. V. Caldwell and W. Wardlaw, J. Chem. Soc., 4775 (1957).

Thus the aforementioned stannic mercaptides can be prepared by an exchange reaction of, for example, stannic t-amyloxide, with methanethiol, propanethiol, isopropanethiol, 1-butanethiol, t-butylthiol, pentanethiol, t-pentanethiol, and the like.

The stannic organophosphates which are used may be represented by the formula:

in which R is a monovalent hydrocarbon radical, saturated or unsaturated, branched chain or straight chain, containing 1 to 18 carbon atoms, preferably 3 to 12. Representative examples of stannic organophosphates include stannic tetrakis[di(propyl)phosphate],
stannic tetrakis[di(isopropyl)phosphate],
stannic tetrakis[di(butyl)phosphate],
stannic tetrakis[di(pentyl)phosphate],
stannic tetrakis[di(hexyl)phosphate],
stannic tetrakis[di(2-ethylhexyl)phosphate],
stannic tetrakis[di(heptyl)phosphate],
stannic tetrakis[di(3-ethylheptyl)phosphate],
stannic tetrakis[di(nonyl)phosphate],
stannic tetrakis[di(4-propylnonyl)phosphate],
stannic tetrakis[di(dodecyl)phosphate],
stannic tetrakis[di(tetradecyl)phosphate],
stannic tetrakis[di(octadecyl)phosphate], and the like.

The stannic organophosphates may be made by an exchange reaction of a stannic alkoxide, such as stannic t-amyloxide, with an organophosphoric acid to form the stannic organophosphate and the corresponding alcohol of the stannic alkoxide. Thus the aforementioned stannic organophosphates can be prepared by an exchange reaction of, for example, stannic t-amyloxide, with dipropylphosphoric acid, diisopropylphosphoric acid, dibutylphosphoric acid, dipentylphosphoric acid, dihexylphosphoric acid, di(2-ethylhexyl)phosphoric acid, diheptylphosphoric acid, di(3-ethylheptyl)phosphoric acid, dinonylphosphoric acid, di(4-propylnonyl)phosphoric acid, didodecylphosphoric acid, di(tetradecyl)phosphoric acid, dioctadecyl phosphoric acid and the like.

It has been further discovered that only selected combinations of the polyepoxide, polyols, anhydride, and catalyst can be employed successfully to yield a laminate which has the aforementioned characteristics. The polyepoxide and the combined high and low molecular weight polyols must be present in a ratio such that the polyepoxide comprises from 30 to 40 weight percent and the polyols from 60 to 70 weight percent based on the weight of combined polyepoxide and polyols. Particularly preferred ratios within the aforesaid ranges are from 32 to 36 weight percent polyepoxide and from 64 to 68 weight percent polyols. Furthermore, the ratio of low molecular weight polyol to the high molecular weight polyol is also critical to the successful practice of the present invention. The two polyol components must be so balanced that sufficient hydroxyl groups are present to provide an adequate cure rate and sufficient long chain molecules present to provide flexibility and strength over a broad temperature range, particularly in the low temperature areas. It has been found that of the total weight of both the low and high molecular polyols at least 85 weight percent must be of the high molecular weight polyols. Below this concentration the desired flexibility and cure rate are not obtained. For any particular concentration of the high molecular weight polyol, the optimum amount of the low molecular weight polyol necessary to increase the overall hydroxyl content to a point sufficient to provide the proper balance, can be determined by routine experimentation. The amount employed, however, must be such as to impart to the composition, when cured, a resin stiffness at 25° C. of from 0.4 to 1.8. As previously indicated and as will be evident from the examples, the necessary physical properties cannot be achieved merely by increasing the amount of high molecular weight polyol to the exclusion of the low molecular weight polyol.

The anhydride components of the laminate is employed in an amount such that from 1.8 to 2.2 carboxyl groups are present per hydroxyl group of the polyol mixture. Ratios of carboxyl groups to hydroxyl groups greater than 2.2 to 1 yield laminates having undesirable color properties which render them unsuitable in cathode ray tube applications. Ratios below 1.8 to 1 yield laminates having decreased tensile strengths, which also render them unsuitable for the intended use. In practice, the anhydride concentration in the laminating resin system must be within the range of from 5 to 20 weight percent, based on the total weight of the laminate.

While the amount of catalyst employed will vary to some degree with the cure rate desired and the curing temperature employed, it is critical that it be kept within the range of from 0.25 to 1.5 weight percent calculated as tin, based on the total weight of the curable epoxy composition. Concentration of the organic tin catalysts above or below the aforesaid range result in resin having an elongation outside the desired range as hereinafter indicated.

Cathode ray tubes which have safely implosion caps or plates laminated thereto are subjected to rather demanding physical tests prior to approval for commercial use. For the purposes of insuring adequate safety and quality control, laminated tubes are generally tested as follows: First the tube having the implosion safety plate or cap laminated to its viewing surface is subjected to thermal cycling from room temperature to minus 40° F. over a four hour period, and then from room temperature to 165° F. over a fifteen hour period. Three full cycles are generally employed in order to fully evaluate the laminated tubes' ability to withstand wide temperature changes without glass or resin failure. The thermal cycling is the severest test applied in evaluating laminated tubes due to the extreme differences between coefficiency of expansion of the resin and the glass. As previously indicated, failure of either or both the resin and the glass plate or cap is more likely to occur at low temperatures. The failure generally occurs on the corner areas where the cap overlaps the cathode ray tube. It is thus apparent that resin flexibility and strength, particularly at low temperatures, are critical features in the laminating of implosion caps to cathode ray tubes.

The second test employed in evaluating laminated tubes involves subjecting the tubes to temperatures of 130° F. for period of up to 200 hours. Resin failures at elevated temperatures have been both adhesive and cohesive and many instances result from poor spacing of the cap relative to the tube. In practice, the resin thickness between the cap and viewing area of the tube is at least 40 mils. It has been noted with the commercially available resin laminates that resin thicknesses below 40 mils usually result in resin failures on aging at 130° to 165° F., particularly in the corner areas. Hence a minimum amount of resin must be present to adequately relieve stresses and position the cap properly. Thus, a resin system which would allow closed spacing without failing at the aforesaid temperatures would result in a definite advantage, particularly from an economic point of view. As previously indicated, the laminating resin system comprised of the aforementioned components, in the concentrations indicated, cures to a laminate having excellent low temperature flexibility and strength. Television picture tubes having implosion caps attached to their viewing surface with the laminating resin of the invention do not undergo failure when subjected to thermal cycling. Moreover, it is possible to employ a resin thickness below 40 mils with no resin failure upon prolonged heating.

In the evaluation of resin properties necessary for acceptable laminated tubes, careful consideration must be given to: (1) resin flexibility and strength at low temperatures, and (2) resin gel temperature. These two features greatly influence glass stress and hence, are integrally related to the success or failure of the laminating resin. Resin flexibility can be defined in terms of resin stiffness or stiffness modulus. Resin stiffness is the ultimate tensile strength divided by the percent elongation at failure. The stiffness modulus is expressed in pounds per square inch and determined at 1 percent elongation over a broad temperature range. The stiffness modulus must not exceed 1000 pounds per square inch at −5° C. Both of these terms are a measurement of the resin flexibility and hence of great importance in determining the stresses resulting from resin shrinkage.

Figure 1:
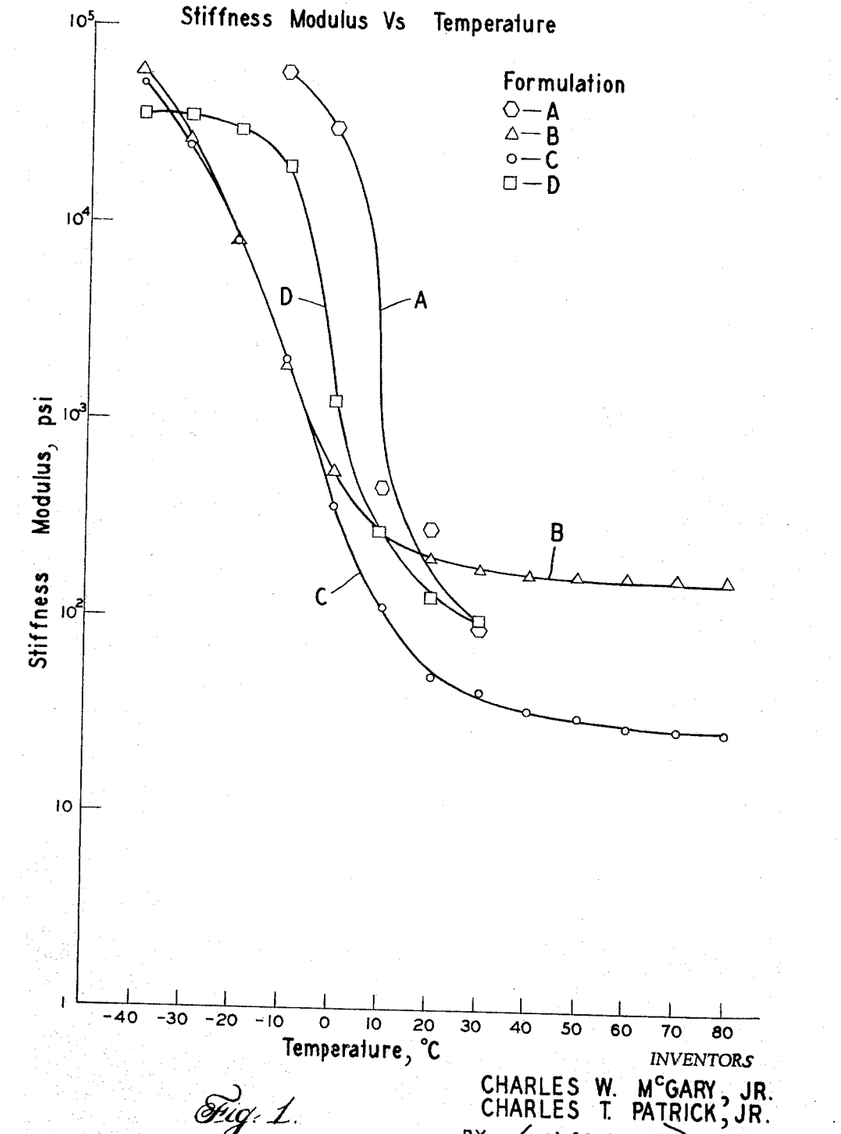

FIGURE 1 is a comparison of stiffness moduli over a broad temperature range for various resin systems employed in laminating implosion caps to cathode ray tubes. The compositions of Formulations A, B and C are set forth in Examples 1–4. Formulation A contained a ratio of polyepoxide to polyols outside the critical range hereinbefore indicated as well as a polyol molecular weight below 750. Although the composition of Formulation B was within the acceptable range, it was deficient in hydroxyl content and hence the resin stiffness as hereinafter indicated was unacceptable. Formulation C was prepared in accordance with the teachings of this invention while Formulation D was a commercially available resin identified as hereinafter indicated. It is evident from FIGURE 1 that the resin prepared from Formulation C has greater flexibility at a given temperature than any of the other resins and hence is capable of relieving greater stresses in the glass implosion cap.

Figure 2:
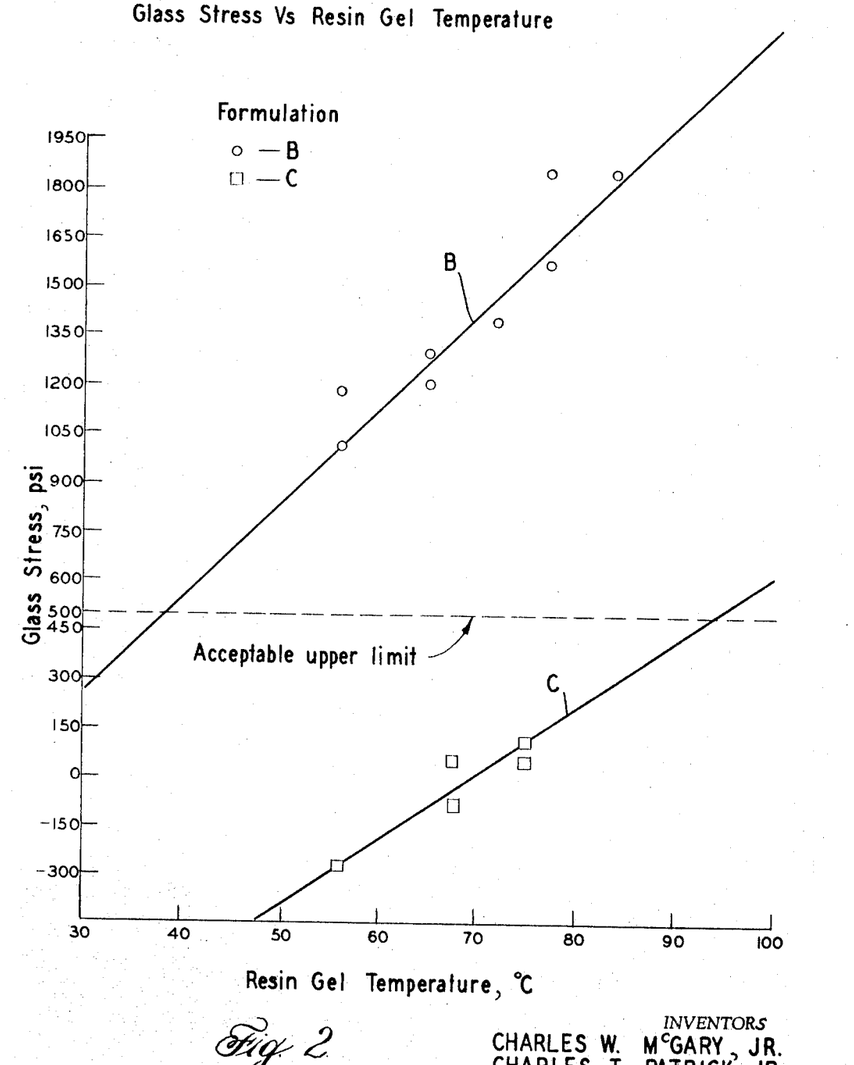

Also of particular interest, as evidenced by Formulation B above, is the interrelationship of resin flexibility and gel temperature on the glass stress. For instance, implosion caps were laminated to separate television tubes with resin systems having respective stiffnesses of 0.55 and 2.5 and using curing temperatures of 55°, 65°, and 75° C. The resins were prepared from the Formulations B and C of the examples, with the exception that Formulation C in this instance contained 60.65 parts of the polypropylene glycol and 5.35 parts of propylene glycol. After curing, the stress present in the corner areas of the implosion caps was measured by a special method employing a notched polarimeter. The stress created in the glass by the resin was found to be directly related to the twisting of a beam of polarized light. A limit of 300–500 pounds per square inch glass stress at room temperature is regarded by television tube manufacturers as the maximum stress acceptable for commercial production. Stress levels of about 2,000 pounds per square inch have resulted in frequent cap failure at room temperature particularly when minor flaws were present. A comparison of the glass stress in the aforementioned two resin systems is made in FIGURE 2. Formulation B had a Durometer A hardness of 50 and a stiffness of 2.5, while Formulation C had a hardness of 25 and a stiffness of 0.55. From the data set forth therein, it is evident that the resin with the higher stiffness would have to have a gel temperature below about 38° C. in order to have an acceptable stress level. In contrast, the resin having lower stiffness can be cured at temperatures as high as 90° C. and still have an acceptable glass stress. It was therefore, found that an upper limit of stiffness of 1.8 at 25° C. was required in order that the glass stress fell below the indicated limit. The lower limit for resin stiffness was found to be 0.4 at 25° C.

In addition to the importance of resin flexibility and gel temperature, consideration must also be given to resin strength and adhesion. It was found that a minimum resin strength of about 150 pounds per square inch in tension at 250–300 percent elongation was required. Moreover, in order to effectively laminate the implosion plate or cap to the viewing surface of the tube, the glass adhesion must approach the cohesive strength of the resin itself.

Figure 3:
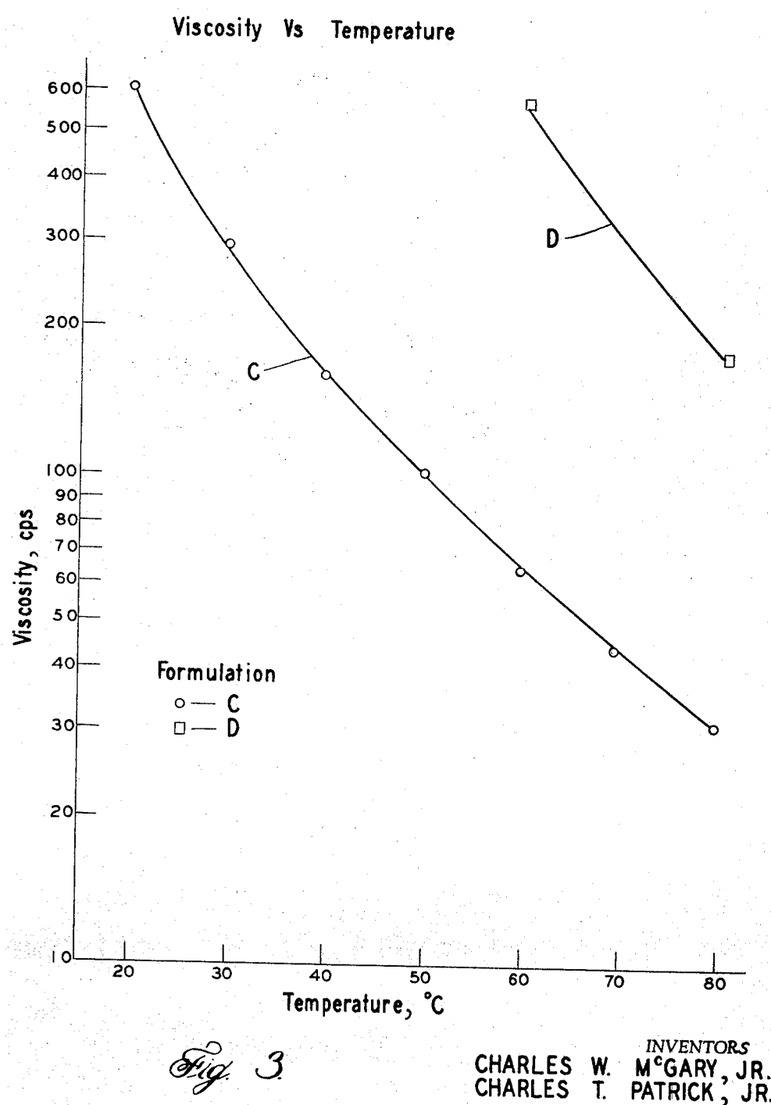

In order for the laminating resin to be commercially suitable in attaching implosion plates or caps to cathode ray tubes, its viscosity must be sufficiently low to permit ease of handling at dispensing temperatures, i.e., 50°–100° C. Moreover, the viscosity should be such that entrapment of air bubbles on the face of the cathode ray tube is avoided. Viscosities in excess of 80 centipoises at a dispensing temperature of 100° C. have been found undesirable for efficient and economical production. When the laminating compositions of the present invention were employed, the viscosity was about 30–35 centipoises at a dispensing temperature of 80° C. In contrast, the viscosity at the same temperature of the commercially available laminating resin, Formulation D, was much higher. At room temperature, i.e. about 25° C., the respective viscosities were 400 and 4000 centipoises as indicated in Examples 3 and 4. FIGURE 3 shows the relationship of viscosity to temperature for Formulations C and D of the examples.

Inasmuch as the laminating compositions of the instant invention have physical properties not heretofore found in resins employed for attaching implosion caps to cathode ray tubes, they can be employed in lesser quantities than presently required. For example, it has been found that the minimum resin thickness at the closest point of contact between the protective member and the viewing surface of the tube must be at least 40 mils for successful lamination. However, it has been found that good lamination of cap to tube can be achieved with as little as a 20 mil thickness when the instant laminating compositions are employed. This undoubtedly results in savings both from production costs and in the resin itself.

In general, the laminating of the implosion plate or cap to the cathode ray tube with the compositions of the present invention can be effected by any one of several methods known to those skilled in the art of cathode ray tube manufacturing. For example, one method involves mounting the cap and tube after thorough cleaning in a jig assembly which positions the cap at a predetermined distance from the face of the tube. The tube and cap are then passed through a heated chamber to give the desired glass temperature, i.e., about 80° C. As the parts emerge from the heating chamber, the cap is lowered from the tube ( or the tube raised from the cap) about one half inch to permit rapid dispensing of the resin into the cap. Thereafter, the glass parts are brought together until the resin is displaced and is forced to fill the cap whereupon the jig assembly is secured. Curing of the resin is generally effected by present day manufacturers at elevated temperatures, i.e., from about 60° to about 100° C., for a period of time of from about 45 to about 60 minutes. In contrast, the resins of the present invention are fully cured after 30 minutes at 80° C. In most instances, the heat present in the glass will be sufficient to cure the resin. However, from a mass production viewpoint it may be desirable to apply additional heat to decrease the curing time.

Throughout the present disclosure and in the following examples, various terms and tests were employed either to describe or evaluate resin properties. These terms and tests are as follows:

(1) *A.S.T.M.*—Americal Society For Testing Materials.

(2) *Tensile-elongation.*—Tensile-elongation values were determined on ring-shape samples cut with a sharp stamping die to a thickness of ⅛″, an internal diameter of ¾″, and an external diameter of 1″.

Frequent sharpening of the stamping die was found an important factor in reproducibility. Also, the conditioning of the resin samples prior to testing affected the resulting properties. For example, die-cut samples aged for 48 hours at 25° C. and 95 percent relative humidity caused about a 60 percent loss in tensile strength. The adapted procedure has therefore been to store the resin plaques to be tested in a dessicator and to cut the tensile test pieces just prior to testing. Tensile-elongation values were determined on a Instron tensile tester operating at a constant rate of elongation of 20 inches per minute. These tests were performed at 23° C.

(3) *Stiffness modulus.*—The secant tensile modulus at one percent elongation as determined on an Instron tensile tester at the desired temperature.

(4) *Hardness.*—Durometer A hardnesses were determined according to ASTM D-785-51.

(5) *Color.*—Gardner color measurements were made using resin case in a standard 13 x 100 mm. test tube.

(6) *Glass adhesion.*—Samples were prepared by casting the desired resin between 6 x 4 x ⅛ glass plates being spaced and sealed with about 75 mil butyl rubber. Before casting, the glass plates were cleaned with cleanser, rinsed with distilled water, rinsed with acetone, and dried at 80° C. for 15 minutes. After curing for 30 minutes at 80° C., the resin-glass sandwich was allowed to cool to 25° C. and one inch squares were marked on the glass surface. The glass plates were then scratched carefully on both sides with a glass cutter and the appropriate squares broken. The resin was then cut with a razor blade to complete the disecting process. Brass ring assemblies were then glued to each face of the sample with an epoxy adhesive. After curing the adhesive, ERL-2774-ZZL-0814, for 30 minutes at 80° C., the samples were allowed to cool to 25° C. An Instron was then used for testing at a jaw travel of 0.5 inch-minute. At least four samples were tested for the reported values.

(7) *Hydroxyl number.*—Is defined as the number of milligrams of potassium hydroxide required for the complete hydrolysis of the polyol. The hydroxyl number can also be defined by the equation:

$$OH = \frac{56.1 \times 1000 \times f}{m.w.}$$

where:
OH=hydroxyl number of the polyol
$f$=functionality, that is, average number of hydroxyl groups per molecule of polyol
m.w.=molecular weight of the polyol.

(8) *Hydroxyl equivalent weight.*—Is the molecular weight of the polyol divided by the average number of hydroxyl groups present in the molecule.

In the following examples resin plaques were prepared and cured in polished stainless steel molds measuring 10 x 6 x ⅛ inches. In each instance, the epoxide, polypropylene glycol, propylene glycol and stannous octoate, were weighed into a suitable container. The mixture was than warmed to 30–32° C. and the desired amount of molten maleic anhydride added. Thereafter the resulting mixture was stirred for two minutes with a spatula and then subjected to a vacuum of 5–10 millimeters of mercury for about two minutes. The resin mixture was then poured into the mold which had been preheated at 80° C. for at least 15 minutes and then cured for 30 minutes at 80° C.

*Examples 1–4*

Three laminating resin formulations were prepared containing the components and concentrations indicated below.

FORMULATION A

Component: Parts by weight
(a) 3,4-epoxy-6-methylcyclohexylmethyl 3,4-epoxy-6-methylcyclohexanecarboxylate __ 43
(b) Polypropylene glycol having a molecular weight of about 425 _____________________ 57
(c) Maleic anhydride _____________________ 20
(d) Stannous octoate _____________________ 2.4

FORMULATION B

Component: Parts by weight
(a) 3,4-epoxy-6-methylcyclohexylmethyl 3,4-epoxy-6-methylcyclohexanecarboxylate _ 34
(b) Polypropylene glycol having a molecular weight of about 2025 ___________________ 63.4
(c) Propylene glycol _____________________ 2.6
(d) Maleic anhydride _____________________ 12.5
(e) Stannous octoate _____________________ 2.3

FORMULATION C

Component: Parts by weight
(a) 3,4-epoxy-6-methylcyclohexylmethyl 3,4-epoxy-6-methylcyclohexanecarboxylate 34.00
(b) Polypropylene glycol having a molecular weight of about 2025 ___________________ 61.67
(c) Propylene glycol _____________________ 4.33
(d) Maleic anhydride _____________________ 17.0
(e) Stannous octoate _____________________ 2.4

Formulation A employed a diol below the minimum molecular weight necessary for the successful practice of the invention. Formulation B, while employing a high molecular weight diol, was deficient in hydroxyl concentration which led to a resin having a stiffness greater than 1.8 which was the limiting factor for acceptable glass stress. Formulation C was prepared in accordance with the teachings of the invention.

For comparison purposes a fourth formulation (Formulation D) was employed which was a commercially available resin produced by the Dow Chemical Co. and identified as D.E.R. 741A hardened with D.E.H. 61 currently being used for laminating implosion caps to television picture tubes.

Each of the formulations was mixed and cast into plaques, according to the procedure previously indicated, and evaluated for its physical properties. As evident from the data set forth in Table I below, it would appear from initial observations that resins prepared from formulations A, B and C essentially duplicated the room temperature, strength properties and the low temperatures flexibility of the commercial resin D. However, as will be noted from the examples which follow, resins prepared from formulations A and B did not have satisfactory physical properties for use as laminating resins in the manufacture of cathode ray tubes.

TABLE I.—COMPARISON OF PHYSICAL PROPERTIES OF VARIOUS RESIN SYSTEMS

| Example | Resin system | Viscosity, cps. at 25° C.,a | Gel time at 80° C., minutes b | Hardness, Durometer A | Tensile Properties | | Adhesion, p.s.i. at 25° C. | Color Gardner | Stiffness, p.s.i./percent elongation |
|---|---|---|---|---|---|---|---|---|---|
| | | | | | Strength, p.s.i. at 25° C. | Elongation, percent at 25° C. | | | |
| 1 | A | 150 | 3–4 | 20 | 215 | 300 | 125 | 3–4 | 0.72 |
| 2 | B | 450 | 7–8 | 45 | 500 | 200 | 300 | 3–4 | 2.5 |
| 3 | C | 400 | 7–8 | 27 | 250 | 280 | 190 | 3–4 | 0.89 |
| 4 | D | 4,000 | 12 | 30 | 200 | 300 | 130 | 2–3 | 0.67 | a Viscosity of resin without hardener or catalyst.
b Determined on a 50 gram mass starting at resin temperatures of about 40° C. for formulations A, B and C, and 70° C. for formulation D.

Examples 5–10

In order to determine the effect of diol equivalent weight and concentration upon physical properties, various molecular weights of from 425 to 2025 were employed. Preparation of the resins was done in the same manner as indicated in the previous examples. From the data set forth in Tables II and III below, it can be seen that the use of the higher molecular weight diol produced resins which, although more rigid at 25° C., were tough and flexible at −20° C. The lower molecular weight diol produced resins which were softer and stronger at 25° C., but weak and rigid at −20° C.

TABLE II.—EFFECT OF DIOL EQUIVALENT WEIGHT ON RESIN PROPERTIES

| Example | Diol Molecular Weight | Equivalent Weight | Diol/Epoxide Ratio | Maleic Anhyd. Conc.,[a] Percent | Hardness, Durometer A at 25° C. | Tensile Strength | |
|---|---|---|---|---|---|---|---|
| | | | | | | p.s.i. | Percent Elong. |
| 5 | 425 | 213 | 54/45 | 25.0 | 40 | 500 | 260 |
| 6 | 1,025 | 513 | 66/34 | 17.7 | 50 | 280 | 170 |
| 7 | 2,025 | 1,013 | 70/30 | 11.1 | 60 | 240 | 150 |

[a] Maleic anhydride concentration was maintained at a carboxyl to hydroxyl ratio of 2 to 1. All resins contained two parts stannous octoate per 100 parts of total resin mixture.

TABLE III.—EFFECT OF DIOL EQUIVALENT WEIGHT AND CONCENTRATION ON RESIN PROPERTIES

| Example | Diol Molecular Weight | Diol Conc., percent [a] | Tensile Strength | | Hardness Durometer A at 25° C. | Barcol [b] at −25° C. |
|---|---|---|---|---|---|---|
| | | | P.s.i. | Percent Elong. | | |
| 8 | 425 | [c] 60 | 110 | 470 | 10 | [d] 60 |
| 9 | 1,025 | 70 | 150 | 258 | 30 | 40 |
| 10 | 2,025 | 70 | 240 | 152 | 60 | 0 |

[a] Percent diol in diol epoxide mixture. The amount of maleic anhydride was adjusted to give a carboxyl/hydroxyl ratio of about 2. All resins contained 2 parts of stannous octoate per 100 parts of mixture and were cured 30 minutes at 80° C.
[b] Barcol Impressor GYZJ-936.
[c] Resins were not obtained at diol concentrations above 60%.
[d] Resin was brittle and weak at −20° C.

Example 11

In order to compare the reactivity of Formulations C and D, 50 gram quantities of each formulation were placed in 4 ounce, wide mouth bottles at room temperature. The bottles were then placed in an oven at 80° C. and gel times were observed by dropping a small lead shot into each bottle every two minutes. Formulation C gelled in 10 minutes while 22 minutes was required for Formulation D. The increased cure rate realized from the use of Formulation C was clearly evident.

Example 12

A laminating resin formulation was prepared containing the following components:

Component: Parts by weight
- (a) 3,4-Epoxy-6-methylcyclohexylmethyl 3,4-epoxy-6-methylcyclohexanecarboxylate --- 34.00
- (b) Polypropylene glycol having a molecular weight of about 2025 ------------------ 61.67
- (c) Propylene glycol -------------------- 4.33
- (d) Maleic anhydride -------------------- 17.0
- (e) Stannous octoate -------------------- 2.4

This formulation was then employed to bond glass implosion caps to twenty-five 23-inch television tubes in accordance with procedures currently in use by television tube manufacturers. After the resin was fully cured, the television tubes were subjected to thermal cycling and prolonged heating at 130°–165° F. No failures occurred either in the resin or the implosion caps.

Example 13

In order to demonstrate the bonding efficiency of the compositions of this invention, implosion caps were bonded to 23 inch cathode ray tubes by standard procedures using resin Formulations C and D. The tubes, however, were spaced relative to the implosion caps in such a fashion as to give a gradient resin thickness ranging from 0 to about 80 mils across the face of the tube. The bonded tubes were then exposed to three test cycles involving heating to 165° F. for 15 hours, cooling to room temperature, cooling from room temperature to −40° C. for four hours, then warming to room temperature. The tube laminated with Formulation D contained cracked resin at about 40 mil thickness and lower while the tube laminated with Formulation C contained resin cracks at 20 mils and below. The superiority of Formulation C for bonding implosion caps to cathode ray tubes was evident from the fact that lesser amounts of resin were required to achieve the same results.

Example 14

Cured resin samples based on Formulations C and D measuring 13/16 inch diameter and 1/8 inch thick were exposed to X-rays for 15 minutes during an X-ray analytical process. This exposure caused severe yellowing of the resin from Formulation D while no change in color was observed for the resin from Formulation C. The superior X-ray resistance of the resins made from Formulation C was clearly evident. This property is particularly important for resins to be used with cathode ray tubes since a significant amount of X-ray irradiation can occur.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. An implosion protected cathode ray tube comprising, in combination, a cathode ray tube and a transparent protective member disposed over the viewing surface of said cathode ray tube, said member being bonded to said viewing surface by a transparent layer, said layer comprising in polymerized form:

(a) a polyepoxide of the formula:

wherein X represents divalent radicals selected from the group consisting of and in which R represents members selected from the group consisting of lower aliphatic hydrocarbon groups and lower oxyalkylene groups and $R_1$ through $R_6$ represent members selected from the group consisting of hydrogen and lower alkyl groups;
(b) a high molecular weight aliphatic polyol having a molecular weight of from 750 to 2500 and an hydroxyl equivalent weight of from 275 to 1250;
(c) a low molecular weight aliphatic polyol having an hydroxyl equivalent weight below 114;
(d) a polycarboxylic acid anhydride derived from an acid having a $K_A$ of at least $2 \times 10^{-5}$; and
(e) an organic tin catalyst;
said polyepoxide and combined high and low molecular weight polyols being present in such relative amounts as to provide from 30 to 40 weight percent polyepoxide and from 60 to 70 weight percent combined polyols, based on the total weight of polyepoxide and polyols; said high molecular weight polyol being present in an amount as to comprise at least 85 weight percent of said combined polyols; said low molecular weight polyol being present in an amount sufficient to impart to said composition when cured a stiffness at 25° C. of from 0.4 to 1.8; said anhydride being present in an amount to provide from 1.8 to 2.2 carboxyl groups per hydroxyl group of said combined polyols; and said organic tin catalyst being present in an amount of from 0.25 to 1.5 weight percent as tin based on the total weight of said laminating composition.

2. An implosion protected cathode ray tube comprising, in combination, a cathode ray tube and a transparent protective member disposed over the viewing surface of said cathode ray tube, said member being bonded to said viewing surface by a transparent layer, said layer comprising in polymerized form:
(a) a polyepoxide of the formula:

wherein X represents divalent radicals selected from the group consisting of and in which R represents members selected from the group consisting of lower aliphatic hydrocarbon groups and lower oxyalkylene groups and $R_1$ through $R_6$ represent members selected from the group consisting of hydrogen and lower alkyl groups.
(b) a polyoxyalkylene glycol having a molecular weight of from 750 to 2500;
(c) an alkylene glycol having an hydroxyl equivalent weight below 114;
(d) a maleic anhydride; and
(e) an organic tin catalyst;
said polyepoxide, polyalkylene glycol, and alkylene glycol being present in such relative amounts as to provide from 30 to 40 weight percent polyepoxide and from 60 to 70 weight percent combined polyoxyalkylene glycol and alkylene glycol based on the total weight of polyepoxide, polyalkylene glycol and alkylene glycol; said polyoxyalkylene glycol being present in an amount such as to comprise at least 85 weight percent of the combined glycols; said alkylene glycol being present in an amount sufficient to impart to said composition when cured a stiffness at 25° C. of from 0.4 to 1.8; said maleic anhydride being present in an amount to provide from 1.8 to 2.2 carboxyl groups per hydroxyl group of said combined glycols; and said organic tin catalyst being present in an amount of from 0.25 to 1.5 weight percent based on the total weight of said laminating composition.

3. The implosion protected cathode ray tube of claim 2 wherein the polyepoxide of said transparent layer is a lower oxyalkylene glycol bis(3,4-epoxy-6-methylcyclohexanecarboxylate).

4. The implosion protected cathode ray tube of claim 2 wherein the polyepoxide of said transparent layer is a lower oxyalkylene glycol bis(3,4-epoxycyclohexanecarboxylate).

5. The implosion protected cathode ray tube of claim 2 wherein the polyepoxide of said transparent layer is a lower alkylene glycol bis(3,4-epoxy-6-methylcyclohexanecarboxylate).

6. The implosion protected cathode ray tube of claim 2 wherein the polyepoxide of said transparent layer is a lower alkylene glycol bis(3,4-epoxycyclohexanecarboxylate).

7. An implosion protected cathode ray tube comprising, in combination, a cathode ray tube and a transparent protective member disposed over the viewing surface of said cathode ray tube, said member being bonded to said viewing surface by a transparent layer, said layer comprising in polymerized form:
(a) the polyepoxide 3,4-epoxy-6-methylcyclohexylmethyl 3,4-epoxy-6-methylcyclohexanecarboxylate;
(b) a polyoxyalkylene glycol having a molecular weight of from 750 to 2500;
(c) an alkylene glycol having an hydroxyl equivalent weight below 114;
(d) a maleic anhydride; and
(e) a stannous acylate catalyst;
said polyepoxide, polyoxyalkylene glycol, and alkylene glycol being present in such relative amounts as to provide from 30 to 40 weight percent polyepoxide and from 60 to 70 weight percent combined polyoxyalkylene glycol and alkylene glycol, based on the total weight of polyepoxide, polyoxyalkylene glycol and alkylene glycol; said polyoxyalkylene glycol being present in an amount such as to comprise at least 85 weight percent of the combined glycols; said alkylene glycol being present in an amount sufficient to impart said composition when cured a stiffness at 25° C. of from 0.4 to 1.8; said maleic anhydride being present in an amount to provide from 1.8 to 2.2 carboxyl groups per hydroxyl group of said combined glycols; and said stannous acylate being present in an amount of from 0.25 to 1.5 weight percent as tin based on the total weight of said laminating composition.

8. An implosion protected cathode ray tube comprising, in combination, a cathode ray tube and a transparent protective member disposed over the viewing surface of said cathode ray tube, said member being bonded to said viewing surface by a transparent layer, said layer comprising in polymerized form:
   (a) the polyepoxide 3,4 - epoxy-6-methylcyclohexylmethyl, 3,4-epoxy-6-methylcyclohexanecarboxylate;
   (b) polypropylene glycol having a molecular weight of from 750 to 2500;
   (c) propylene glycol;
   (d) maleic anhydride; and
   (e) stannous octoate;
said polyepoxide, polypropylene glycol, and propylene glycol being present in such relative amounts as to provide from 32 to 36 weight percent polyepoxide and from 64 to 68 weight percent combined polypropylene glycol and propylene glycol; based on the total weight of polyepoxide, polypropylene glycol and propylene glycol; said polypropylene glycol being present in an amount such as to comprise at least 85 weight percent of the combined glycols; said propylene glycol being present in an amount sufficient to impart to said composition when cured a stiffness at 25° C. of from 0.4 to 1.8; said maleic anhydride being present in an amount to provide from 1.8 to 2.2 carboxyl groups per hydroxyl group of said combined glycols; and said stannous octoate being present in an amount of from 0.25 to 1.5 weight percent as tin based on the total weight of said laminating composition.

References Cited by the Examiner

UNITED STATES PATENTS

| | | | |
|---|---|---|---|
| 2,293,529 | 8/1942 | Bedford | 220—2.1 |
| 2,890,196 | 6/1959 | Phillips et al. | 260—835 |
| 2,908,660 | 10/1959 | Belander | 260—835 |
| 2,933,459 | 4/1960 | Gurgiolo | 260—2 |
| 3,113,347 | 12/1963 | Kufrovich | 220—2.1 |

MURRAY TILLMAN, *Primary Examiner.*

J. C. BLEUTGE, *Assistant Examiner.*